United States Patent
Kadur et al.

(10) Patent No.: US 9,473,495 B2
(45) Date of Patent: Oct. 18, 2016

(54) USER AUTHENTICATION FOR PROXY-CONFIGURED CLIENTS IN CAPTIVE PORTAL ENVIRONMENTS

(71) Applicant: Avaya Inc., Basking Ridge, NJ (US)

(72) Inventors: Manish Manjunath Kadur, Bangalore (IN); Atul Prabhu, Bangalore (IN)

(73) Assignee: Avaya Inc., Santa Clara, CA (US)

(*) Notice: Subject to any disclaimer, the term of this patent is extended or adjusted under 35 U.S.C. 154(b) by 88 days.

(21) Appl. No.: 14/502,890

(22) Filed: Sep. 30, 2014

(65) Prior Publication Data
US 2016/0094557 A1 Mar. 31, 2016

(51) Int. Cl.
*H04L 29/06* (2006.01)
*H04L 29/12* (2006.01)

(52) U.S. Cl.
CPC ........ *H04L 63/0884* (2013.01); *H04L 61/1511* (2013.01)

(58) Field of Classification Search
CPC ........... H04L 63/0281; H04L 61/1511; H04L 61/6013; G06F 21/44
See application file for complete search history.

(56) References Cited

U.S. PATENT DOCUMENTS

2007/0204051 A1* 8/2007 Zhang ............... H04L 29/12066
 709/230
2014/0344890 A1* 11/2014 Warrick ............. H04L 63/0281
 726/1

* cited by examiner

*Primary Examiner* — Izunna Okeke

(57) ABSTRACT

Methods, systems and computer readable media for user authentication for proxy-configured clients in captive portal deployments are described. In some implementations, the method can include receiving, at a captive portal, a request from a client device to resolve a proxy IP address, and determining whether the client device has been authenticated. The method can also include, when the client device has not been authenticated, causing the captive portal to act as an intermediate domain name system (DNS) server and forwarding the DNS request to one or more other DNS servers, and evaluating any received responses from the one or more other DNS servers. The method can include, when received responses contain an IP address, replying to the client with the received IP address, and when the received responses do not contain an IP address, replying to the client with an IP address of the captive portal.

3 Claims, 5 Drawing Sheets

USER AUTHENTICATION FOR PROXY-CONFIGURED CLIENTS IN CAPTIVE PORTAL ENVIRONMENTS

TECHNICAL FIELD

Embodiments relate generally to computer networks, and more particularly, to methods, systems and computer readable media for user authentication for proxy-configured clients in captive portal environments.

BACKGROUND

In captive portal deployments or environments, problems may arise when attempting to authenticate a client device having proxy settings configured. Embodiments were conceived in light of the above mentioned needs, problems and/or limitations, among other things.

SUMMARY

One or more embodiments can include methods, systems and computer readable media for user authentication for proxy-configured clients in captive portal environments. In some implementations, the method can include receiving, at a captive portal, a request from a client device to resolve a proxy IP address, and determining, at the captive portal, whether the client has been authenticated. The method can also include, when the client has not been authenticated, causing the captive portal to act as an intermediate domain name system (DNS) server and forwarding the DNS request to one or more other DNS servers, and evaluating, at the captive portal, any received responses from the one or more other DNS servers. The method can further include determining whether the received responses contain an Internet Protocol (IP) address. The method can also include, when the received responses contain an IP address, replying to the client with the received IP address. The method can further include, when the received responses do not contain an IP address, replying to the client with an IP address of the captive portal.

The method can also include completing, at the captive portal, a handshake with the client, and intercepting, at the captive portal, a GET request from the client and redirecting the client to a captive portal login page. The method can further include attempting, at the captive portal, to authenticate the client, and, when the client is successfully authenticated, terminating a TCP session with the client and providing a warning to the client device, for viewing by a user of the client device, that a proxy is configured on the client device. The method can also include, when the client is not successfully authenticated, causing an error page to be displayed on the client device and repeating an authentication procedure for subsequent access.

The method can further include interrupting, at the captive portal, a handshake between the client and the proxy IP address, and completing, at the captive portal, a handshake with the client with the captive portal posing as a system having the proxy IP address. The method can also include intercepting a GET request from the client and redirecting the client to a captive portal login page, and attempting, at the captive portal, to authenticate the client. The method can further include, when the client is successfully authenticated, terminating a TCP session with the client and redirecting the client device to the proxy IP address, and when the client is not successfully authenticated, causing an error page to be displayed on the client device and repeating an authentication procedure for subsequent access.

Some implementations can include a system comprising one or more processors configured to perform operations or a nontransitory computer readable medium having stored thereon software instructions that, when executed by a processor, cause the processor to perform operations. In either the system or nontransitory computer readable medium implementations, the operations can include receiving, at an captive portal, a request from a client device to resolve a proxy IP address, and determining, at the captive portal, whether the client has been authenticated. The operations can also include when the client has not been authenticated, causing the captive portal to act as an intermediate domain name system (DNS) server and forwarding the DNS request to one or more other DNS servers. The operations can further include evaluating, at the captive portal, any received responses from the one or more other DNS servers, and determining whether the received responses contain an Internet Protocol (IP) address. The operations can also include, when the received responses contain an IP address, replying to the client with the received IP address, and, when the received responses do not contain an IP address, replying to the client with an IP address of the captive portal.

The operations can further include completing, at the captive portal, a handshake with the client, and intercepting, at the captive portal, a GET request from the client and redirecting the client to a captive portal login page. The operations can also include attempting, at the captive portal, to authenticate the client, and when the client is successfully authenticated, terminating a TCP session with the client and providing a warning to the client device, for viewing by a user of the client device, that a proxy is configured on the client device. The operations can further include when the client is not successfully authenticated, causing an error page to be displayed on the client device and repeating an authentication procedure for subsequent access.

The operations can also include interrupting, at the captive portal, a handshake between the client and the proxy IP address, and completing, at the captive portal, a handshake with the client with the captive portal posing as a system having the proxy IP address. The operations can further include intercepting a GET request from the client and redirecting the client to a captive portal login page, and attempting, at the captive portal, to authenticate the client. The operations can also include when the client is successfully authenticated, terminating a TCP session with the client and redirecting the client device to the proxy IP address, and when the client is not successfully authenticated, causing an error page to be displayed on the client device and repeating an authentication procedure for subsequent access.

DETAILED DESCRIPTION

Figure 1:
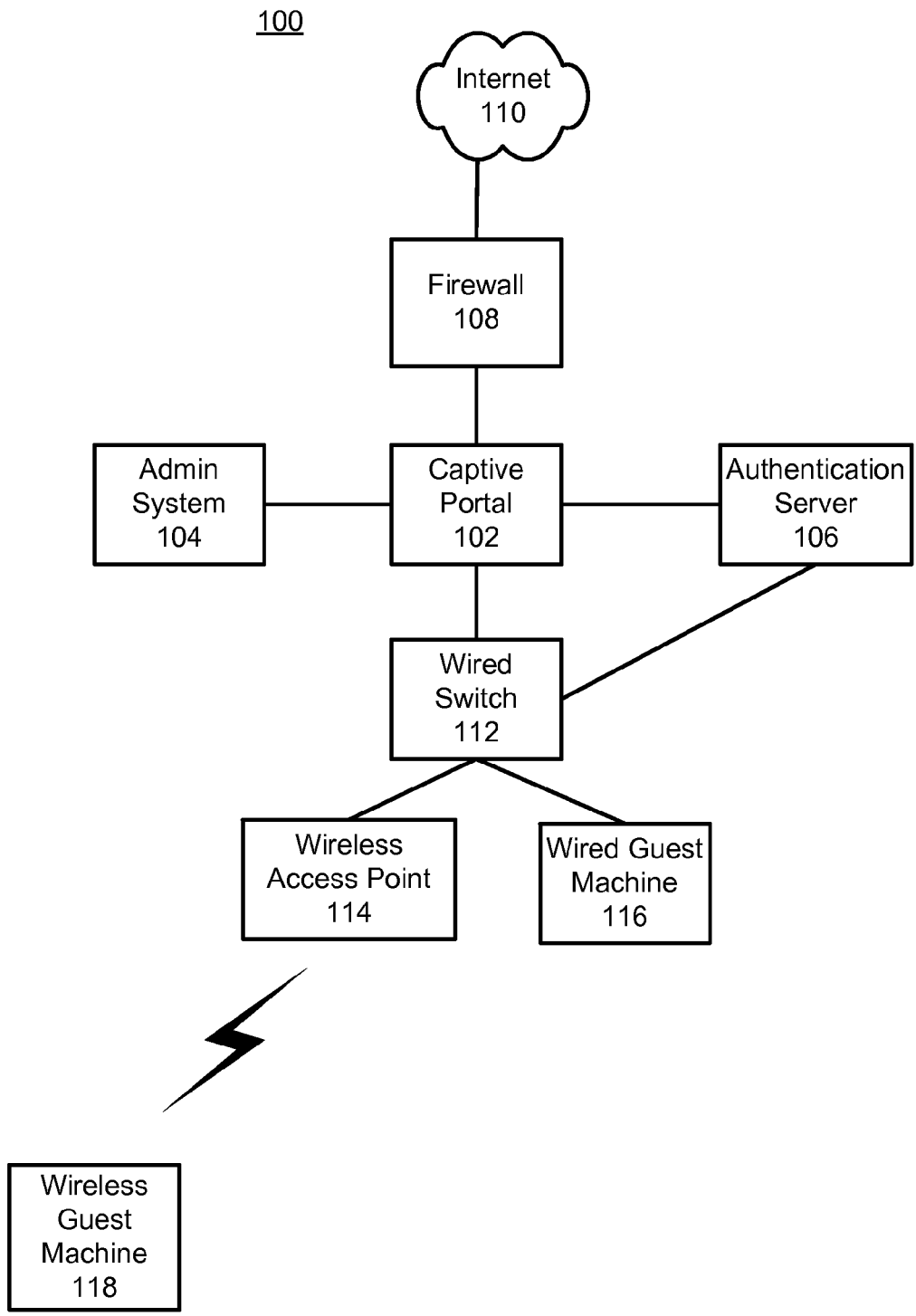
FIG. 1 is a diagram of an example network environment for user authentication for proxy-configured clients in captive portal environments in accordance with at least one implementation.

FIG. 1 is a diagram of an example network environment 100 for user authentication for proxy-configured clients in captive portal environments in accordance with at least one implementation. The example environment 100 includes a captive portal 102, an administrator system 104, an authentication server 106 (e.g., an Ignition server made by Avaya Inc.), a firewall 108, the Internet 110 (or other network), a wired switch 112, a wireless access point 114, a wired guest machine 116 (e.g., client device) and a wireless guest machine (e.g., client device).

In some conventional systems, when a client device (e.g., 116 or 118) is configured with a proxy setting such as a proxy IP address and the network is protected with a captive portal 102 deployment, there can be problems when attempting to authenticate the client device. For example, if a user wants to enter a network protected by a captive portal, the user will typically need to be authenticated before access is granted to the network. In some cases, the user's device(s) (e.g., client devices) are configured with proxy settings (not public proxy) for a proxy server, which controls the access available within an enterprise. In most cases, these proxy servers are accessible only within the enterprise domain.

Typically, a user may not even be aware of the proxy settings configured on the client device. If the client device is configured with a proxy and the user tries to access another organization's network (protected by a captive portal deployment), then the captive portal may not be able to authenticate the user (as the configured proxy server will not be accessible) nor be able to indicate the reason for failure to the user.

For example, when a captive portal is deployed, the interaction between the client machine and the captive portal could be as follows:

A) A user connects the client device to the network (e.g., using either a wired or wireless connection).

B) The user opens up a browser and tries accessing a URL.

C) At this time, the captive portal intercepts this HTTP/HTTPS request and instead of the originally requested page, displays its own landing page which is the login page to the captive portal.

D) User logs in to the captive portal.

E) The captive portal uses the supplied credentials to authenticate against an authentication server (e.g., Ignition Server, a RADIUS Server made by Avaya Inc.).

F) After successful authentication, the captive portal redirects the user to the originally requested page. If authentication fails, an error page indicating the same is shown.

However, if the client device (or machine) is configured with a proxy and the user tries to browse any particular URL in a captive portal deployment, the following example steps may occur:

A) The browser will first try to resolve the proxy address using DNS.

B) In most cases, the proxy settings are local to the user's environment (e.g., not a public proxy, but an enterprise proxy or the like) and if the proxy is not reachable, the DNS server may respond with a message such as "No Such Name" or the like.

C) The browser may never be able to resolve the proxy's domain name and the subsequent GET (for the originally requested resource) may never be triggered. Without this GET request, the captive portal may never be able to intercept the request and redirect the user to its own login page.

D) In cases where proxy address resolution happens locally on the client machine or when the client machine has cached the proxy's IP address, the client will never be able to reach the proxy.

E) In both of these cases (C and D), the captive portal may never be able to authenticate the client, and may not be able to provide an indication to the client regarding the nature of the problem (i.e., that proxy settings are configured on the client machine).

In operation, an implementation of the system described herein using the process described below can overcome the above-mentioned problems and limitations by providing for an authentication process for a client device having proxy settings configured. Details of an example method for user authentication for proxy-configured clients in captive portal environments are described below in connection with FIGS. 2-4.

Figure 2:
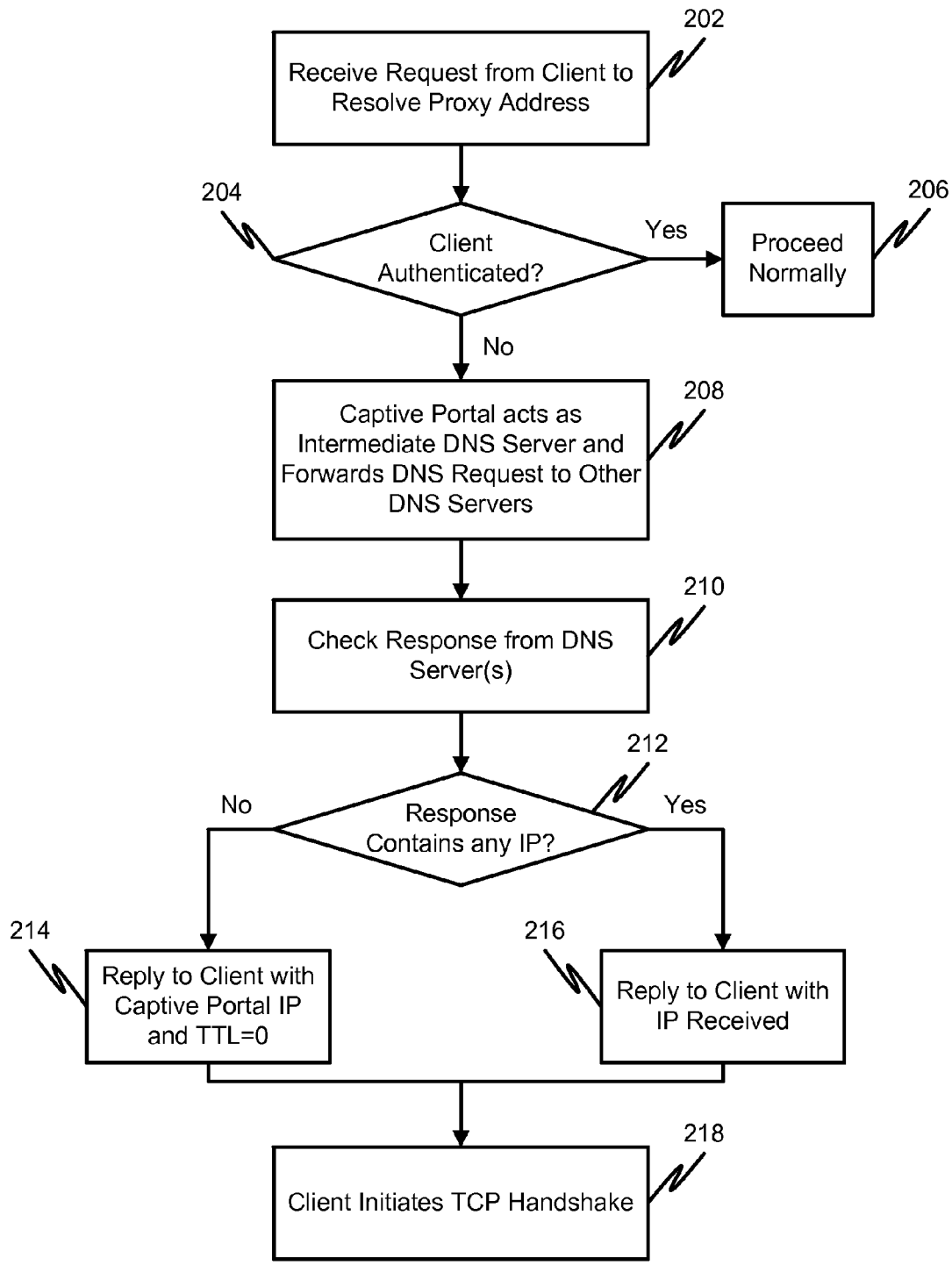
FIG. 2 is a flow chart of an example method for user authentication for proxy-configured clients in captive portal environments in accordance with at least one implementation.

FIG. 2 is a flow chart of an example method for user authentication for proxy-configured clients in captive portal environments in accordance with at least one implementation. Processing begins at 202, where a request from a client device (e.g., 116 or 118) is received at a captive portal (e.g., 102). The request may be received via one or more other standard network systems or components such as a wireless access point 114, wired switch 112 or the like. The request can include a DNS request to resolve a proxy address. Processing continues to 204.

At 204, the captive portal determines whether the client device is authenticated or not. If the client device is authenticated, processing continues to 206, where the processing continues normally. If the client device is not authenticated, then processing continues to 208.

At 208, the captive portal acts as an intermediate DNS server and forwards the DNS proxy address request to one or more other DNS servers. Processing continues to 210.

At 210, the captive portal checks any responses received from the one or more other DNS servers. Processing continues to 212.

At 212, the captive portal determines whether any of the received responses from the other DNS servers contains an IP address for the proxy. If the responses do not contain an IP address, processing continues to 214. If any of the responses contains an IP address, processing continues to 216.

At 214, the captive portal replies to the client with the IP address of the captive portal and an indication to not cache the address (e.g., by sending TTL=0). Processing continues to 218.

At 216, the captive portal replies to the client with the received IP address. Processing continues to 218.

At 218, the client initiates a transmission control protocol (TCP) handshake.

Figure 3:
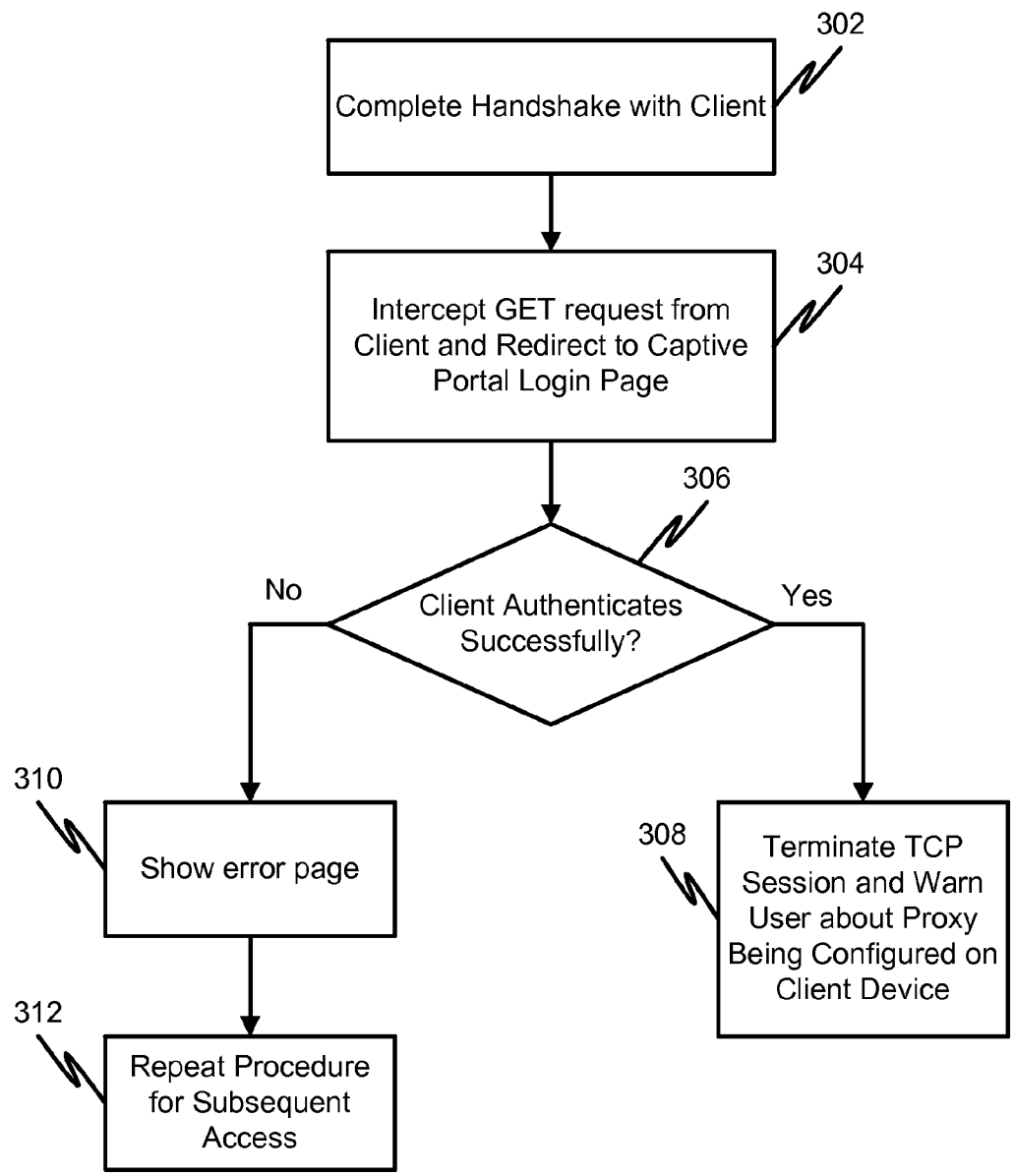
FIG. 3 is a flow chart of an example method for user authentication for proxy-configured clients in captive portal environments in accordance with at least one implementation.

If the TCP handshake is proceeding with the captive portal IP, then the flowchart shown in FIG. 3 applies. If the handshake is proceeding with a resolved IP or locally cached IP, then the flowchart in FIG. 4 applies.

FIG. 3 is a flow chart of an example method for user authentication for proxy-configured clients in captive portal environments in accordance with at least one implementation. Processing begins at 302, where a handshake (e.g., a TCP handshake) is completed between the client (e.g., 116 or 118) and the captive portal (e.g., 102). Processing continues to 304.

At 304, after the client initiates a GET request (or the like), the captive portal intercepts the GET request and redirects the client to the captive portal login page for authentication. Processing continues to 306.

At 306, the captive portal determines whether the client was successfully authenticated. If the client was successfully authenticated, processing continues to 308. If the client was not successfully authenticated, processing continues to 310.

At 308, the TCP session is terminated between the client and the captive portal and the user, via the client device, is provided with a warning about the proxy being configured on the client device.

At 310, an error page is shown to the user, via the client device. Processing continues to 312.

At 312, the procedure (e.g., all or part of the process shown in FIG. 3) is repeated in a subsequent attempt to authenticate the client device.

Figure 4:
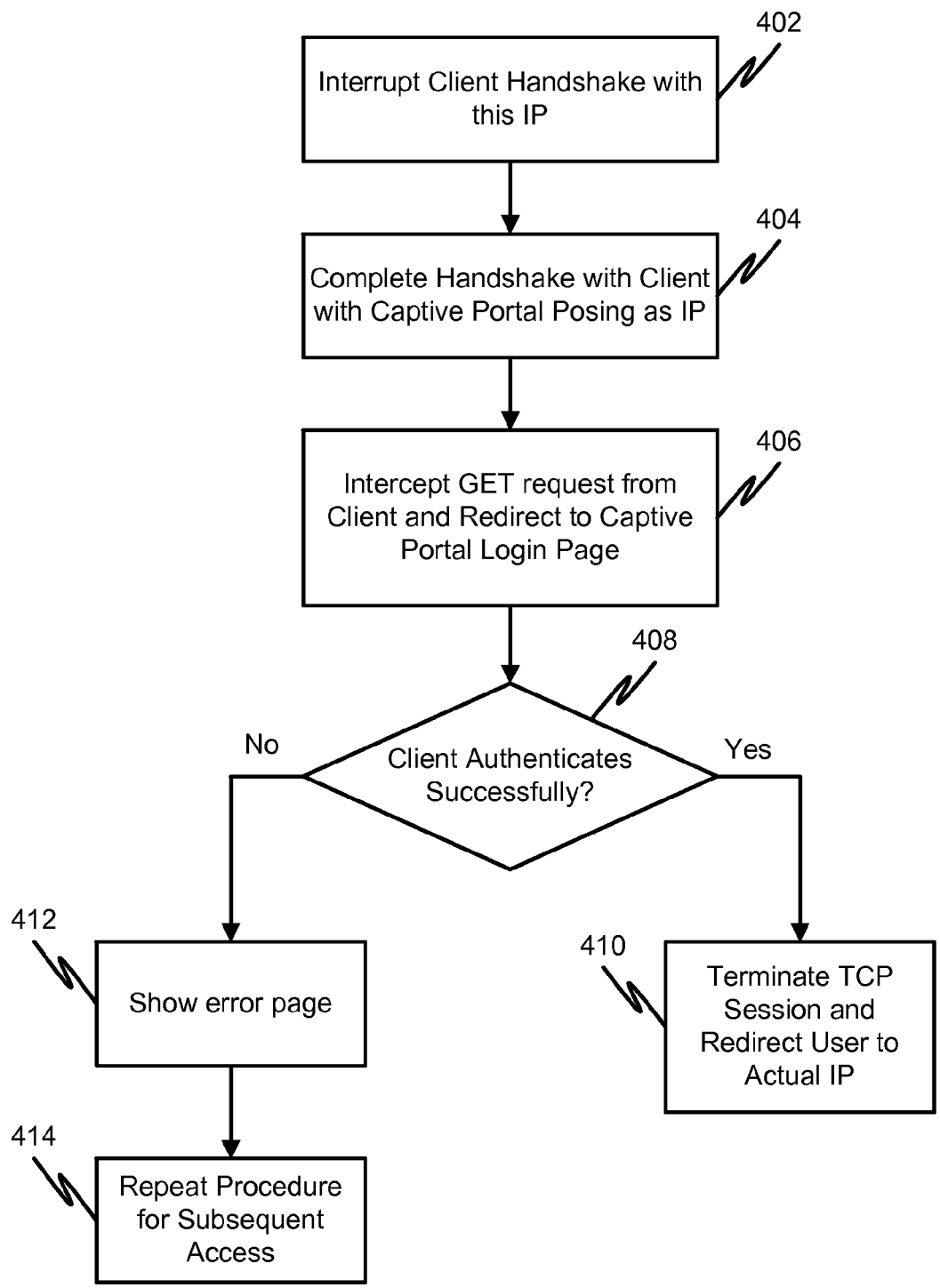
FIG. 4 is a flow chart of an example method for user authentication for proxy-configured clients in captive portal environments in accordance with at least one implementation.

FIG. 4 is a flow chart of an example method for user authentication for proxy-configured clients in captive portal environments in accordance with at least one implementation. Processing begins at 402, where the captive portal interrupts the handshake (e.g., TCP handshake) process between the client device and the proxy IP address. Processing continues to 404.

At 404, a handshake (e.g., a TCP handshake) is completed between the client (e.g., 116 or 118), with the captive portal (e.g., 102) posing as the system having the proxy IP address. Processing continues to 406.

At 406, after the client initiates a GET request (or the like), the captive portal intercepts the GET request and redirects the client to the captive portal login page for authentication. Processing continues to 408.

At 408, the captive portal determines whether the client was successfully authenticated. If the client was successfully authenticated, processing continues to 410. If the client was not successfully authenticated, processing continues to 412.

At 410, the TCP session is terminated between the client and the captive portal and the client device is redirected to the actual proxy IP address.

At 412, an error page is shown to the user, via the client device. Processing continues to 414.

At 414, the procedure (e.g., all or part of the process shown in FIG. 4) is repeated in a subsequent attempt to authenticate the client device.

It will be appreciated that the processes shown in FIGS. 2-4 may be repeated in whole or in part in order to accomplish a client authentication with proxy settings in a captive portal deployment (or environment).

Figure 5:
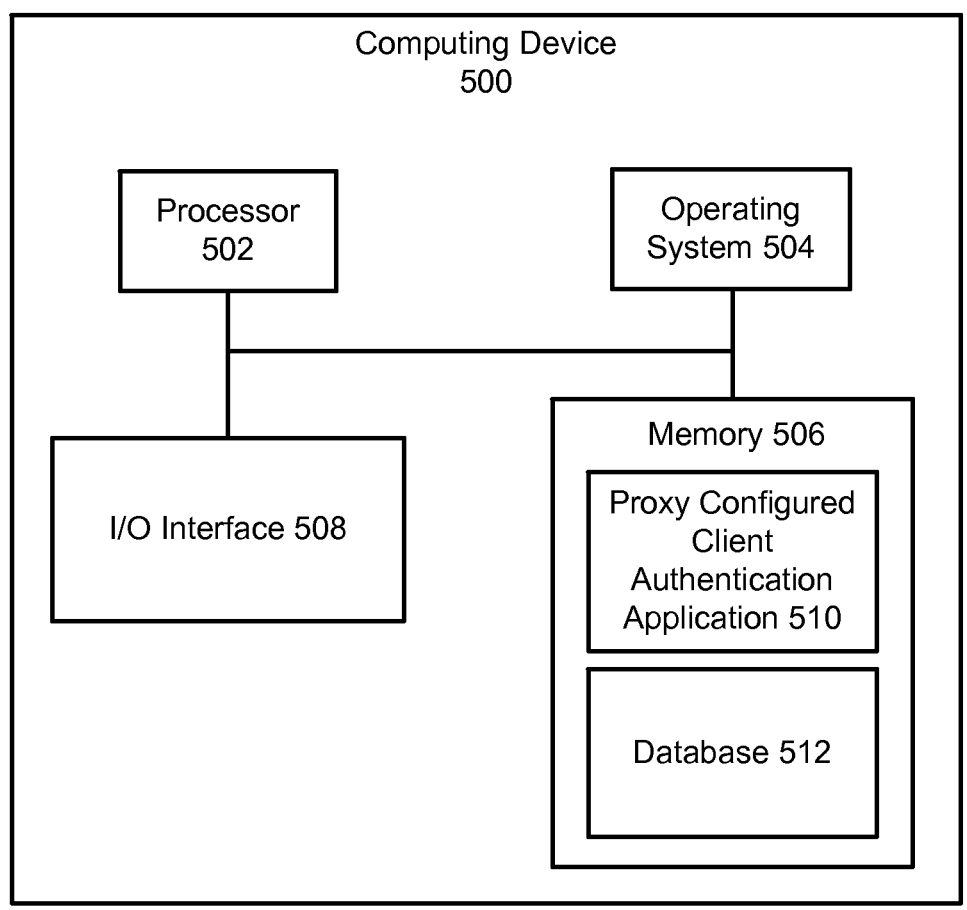
FIG. 5 is a diagram of an example computer system for user authentication for proxy-configured clients in captive portal environments in accordance with at least one implementation.

FIG. 5 is a diagram of an example computer system 500 (e.g., a computer system in a captive portal (or switch or server), a core switch or the like) in accordance with at least one implementation. The computer 500 includes a processor 502, operating system 504, memory 506 and I/O interface 508. The memory 506 can include an application for user authentication for proxy-configured clients in captive portal environments 510 and a database 512 (e.g., for storing MAC address redirection tables or the like).

In operation, the processor 502 may execute the application 510 stored in the memory 506. The application 510 can include software instructions that, when executed by the processor, cause the processor to perform operations for user authentication for proxy-configured clients in captive portal environments in accordance with the present disclosure (e.g., performing one or more of steps 202-218, 302-312 or 402-414).

The application program 510 can operate in conjunction with the database 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for user authentication for proxy-configured clients in captive portal environments.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
receiving, at a captive portal, a request from a client device to resolve a proxy IP address;
determining, at the captive portal, whether the client has been authenticated;
when the client has not been authenticated, causing the captive portal to act as an intermediate domain name system (DNS) server and forwarding the DNS request to one or more other DNS servers;
evaluating, at the captive portal, any received responses from the one or more other DNS servers;
determining whether the received responses contain an Internet Protocol (IP) address;
when the received responses contain an IP address, replying to the client with the received IP address;
when the received responses do not contain an IP address, replying to the client with an IP address of the captive portal;
completing, at the captive portal, a handshake with the client;
intercepting, at the captive portal, a GET request from the client and redirecting the client to a captive portal login page;
attempting, at the captive portal, to authenticate the client;
when the client is successfully authenticated, terminating a TCP session with the client and providing a warning to the client device, for viewing by a user of the client device, that a proxy is configured on the client device;
when the client is not successfully authenticated, causing an error page to be displayed on the client device and repeating an authentication procedure for subsequent access;
interrupting, at the captive portal, a handshake between the client and the proxy IP address;
completing, at the captive portal, a handshake with the client with the captive portal posing as a system having the proxy IP address;
intercepting a GET request from the client and redirecting the client to a captive portal login page provided by the captive portal;
attempting, at the captive portal, to authenticate the client;
when the client is successfully authenticated, terminating a TCP session with the client and redirecting the client device to the proxy IP address; and
when the client is not successfully authenticated, causing an error page to be displayed on the client device and repeating an authentication procedure for subsequent access.

2. A system comprising one or more processors configured to perform operations including:
receiving, at a captive portal, a request from a client device to resolve a proxy IP address;
determining, at the captive portal, whether the client has been authenticated;
when the client has not been authenticated, causing the captive portal to act as an intermediate domain name system (DNS) server and forwarding the DNS request to one or more other DNS servers;
evaluating, at the captive portal, any received responses from the one or more other DNS servers;
determining whether the received responses contain an Internet Protocol (IP) address;
when the received responses contain an IP address, replying to the client with the received IP address; and
when the received responses do not contain an IP address, replying to the client with an IP address of the captive portal;
completing, at the captive portal, a handshake with the client;
intercepting, at the captive portal, a GET request from the client and redirecting the client to a captive portal login page;
attempting, at the captive portal, to authenticate the client;
when the client is successfully authenticated, terminating a TCP session with the client and providing a warning to the client device, for viewing by a user of the client device, that a proxy is configured on the client device;
when the client is not successfully authenticated, causing an error page to be displayed on the client device and repeating an authentication procedure for subsequent access;
interrupting, at the captive portal, a handshake between the client and the proxy IP address;
completing, at the captive portal, a handshake with the client with the captive portal posing as a system having the proxy IP address;
intercepting a GET request from the client and redirecting the client to a captive portal login page provided by the captive portal;
attempting, at the captive portal, to authenticate the client;

when the client is successfully authenticated, terminating a TCP session with the client and redirecting the client device to the proxy IP address; and when the client is not successfully authenticated, causing an error page to be displayed on the client device and repeating an authentication procedure for subsequent access.

3. A nontransitory computer readable medium having stored thereon software instructions that, when executed by a processor, cause the processor to perform operations including:

receiving, at a captive portal, a request from a client device to resolve a proxy IP address;

determining, at the captive portal, whether the client has been authenticated;

when the client has not been authenticated, causing the captive portal to act as an intermediate domain name system (DNS) server and forwarding the DNS request to one or more other DNS servers;

evaluating, at the captive portal, any received responses from the one or more other DNS servers;

determining whether the received responses contain an Internet Protocol (IP) address;

when the received responses contain an IP address, replying to the client with the received IP address; and when the received responses do not contain an IP address, replying to the client with an IP address of the captive portal;

completing, at the captive portal, a handshake with the client;

intercepting, at the captive portal, a GET request from the client and redirecting the client to a captive portal login page;

attempting, at the captive portal, to authenticate the client;

when the client is successfully authenticated, terminating a TCP session with the client and providing a warning to the client device, for viewing by a user of the client device, that a proxy is configured on the client device;

when the client is not successfully authenticated, causing an error page to be displayed on the client device and repeating an authentication procedure for subsequent access;

interrupting, at the captive portal, a handshake between the client and the proxy IP address;

completing, at the captive portal, a handshake with the client with the captive portal posing as a system having the proxy IP address;

intercepting a GET request from the client and redirecting the client to a captive portal login page provided by the captive portal;

attempting, at the captive portal, to authenticate the client;

when the client is successfully authenticated, terminating a TCP session with the client and redirecting the client device to the proxy IP address; and when the client is not successfully authenticated, causing an error page to be displayed on the client device and repeating an authentication procedure for subsequent access.

* * * * *